(12) United States Patent
Bishop

(10) Patent No.: US 6,869,051 B2
(45) Date of Patent: Mar. 22, 2005

(54) CLIP

(75) Inventor: Jeffrey C Bishop, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/352,994

(22) Filed: Jan. 29, 2003

(65) Prior Publication Data

US 2003/0146351 A1 Aug. 7, 2003

(30) Foreign Application Priority Data

Feb. 2, 2002 (GB) .............................................. 0202470

(51) Int. Cl.[7] .............................................. F16B 45/00
(52) U.S. Cl. ...................................... 248/71; 248/74.1
(58) Field of Search .................... 248/71, 73, 74.1, 248/222.51, 222.52, 56, 74.2, 231.9, 278, 279, 21 R, 274.6, 74.3, 74.5; 411/549

(56) References Cited

U.S. PATENT DOCUMENTS

| | | | | | |
|---|---|---|---|---|---|
| 2,469,451 A | * | 5/1949 | Burrus | .................. | 248/222.12 |
| 3,024,509 A | * | 3/1962 | Hamann | ...................... | 24/453 |
| 3,954,344 A | | 5/1976 | Nakama | | |
| 4,131,258 A | * | 12/1978 | Okuda | .......................... | 248/73 |
| 4,467,987 A | * | 8/1984 | Small | ......................... | 248/68.1 |
| 4,527,760 A | * | 7/1985 | Salacuse | ..................... | 248/108 |
| 5,393,021 A | * | 2/1995 | Nelson | ......................... | 248/71 |
| 5,873,550 A | | 2/1999 | Phillips | | |
| 6,209,827 B1 | * | 4/2001 | Kawai | ......................... | 248/73 |
| 6,554,232 B1 | * | 4/2003 | Macris | ........................ | 248/71 |
| 6,612,525 B2 | * | 9/2003 | Bagdi | .......................... | 248/71 |

FOREIGN PATENT DOCUMENTS

| | | | |
|---|---|---|---|
| FR | 2786538 | P | 6/2000 |
| GB | 2199883 | A | 7/1988 |

* cited by examiner

Primary Examiner—Gwendolyn Baxter
(74) Attorney, Agent, or Firm—W. Warren Taltavull; Manelli Denison & Selter PLLC

(57) ABSTRACT

An inverted Ω-shaped clip (10) comprises first and second C-shaped clamping members (12,14) interconnected by an interconnecting member (16). The interconnecting member (16) has attachment means (22) whereby the inverted Ω-shaped clip (10) is rotatable between a first position in which the attachment means (22) of the inverted Ω-shaped clip (10) is insertable and/or removable from an aperture (42) in a support member (40) and a second position in which the attachment means (22) of the inverted Ω-shaped clip (10) is secured in the aperture (42) in the support member (40).

15 Claims, 3 Drawing Sheets

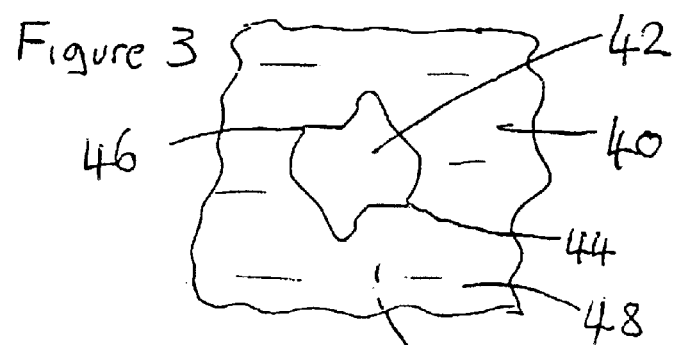
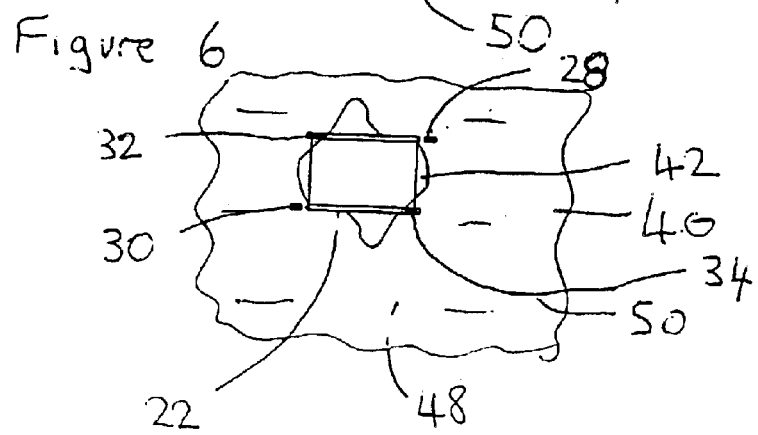
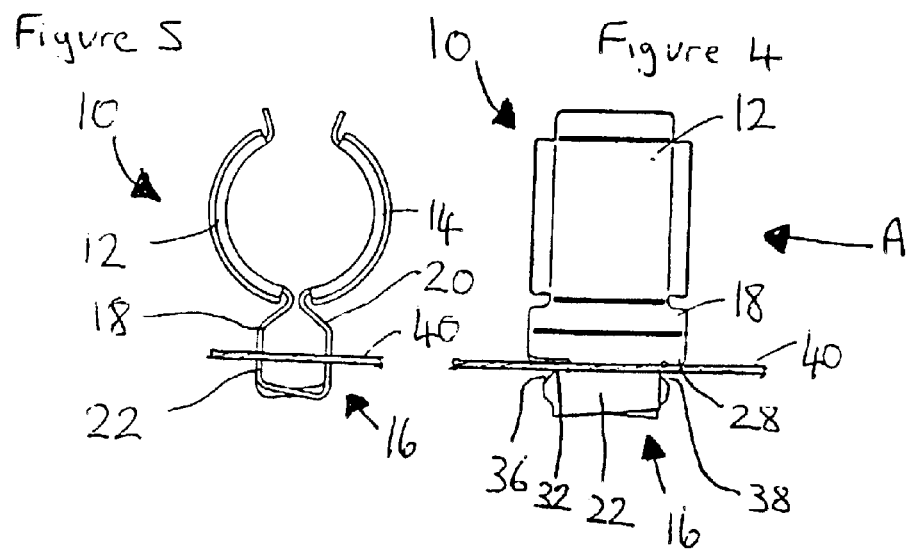

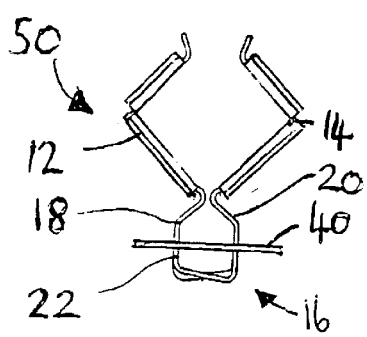
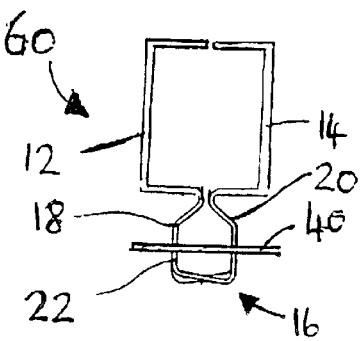
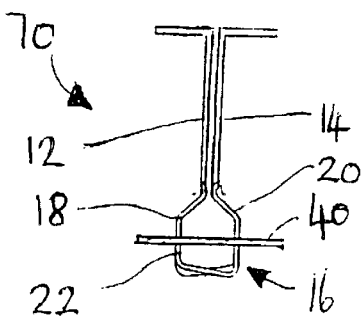
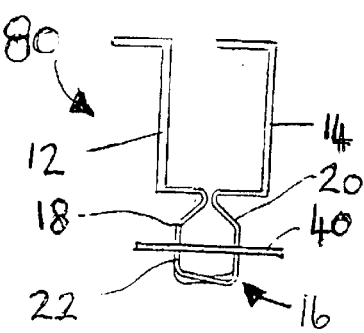
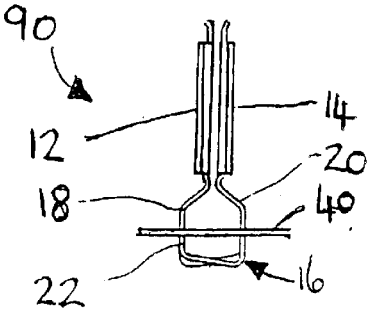

CLIP

FIELD OF THE INVENTION

The present invention relates to a clip. The present invention relates in particular to an inverted Ω-shaped, or broom-handle, clip.

BACKGROUND OF THE INVENTION

Clips are used to locate and support fuel pipes, lubricant pipes, electrical harnesses etc on gas turbine engines, internal combustion engines, aircraft, ships, motor cars and other vehicles as well as in other engineering, industrial and domestic applications. Clips are also used to locate and support other objects, for example a broom handle.

One known form of clip is a P-shaped clip wherein the aperture in the P-shaped clip is arranged to receive a pipe and the leg of the P-shaped clip is provided with an aperture through which a fastener extends to secure the P-shaped clip to a support structure. The P-shaped clip comes in different sizes, designs and complexity of assembly. The P-shaped clip has the advantage of providing excellent location and retention of a pipe, however it does not allow speedy installation during initial build of an engine or subsequent removal and replacement during maintenance.

Another known form of clip is an inverted Ω-shaped clip wherein the space between the legs of the inverted Ω-shaped clip is arranged to receive a pipe and the base of the inverted Ω-shaped clip is provided with an aperture through which a fastener extends to secure the inverted Ω-shaped clip to a support structure. The inverted Ω-shaped clip has the advantage of allowing insertion and removal of the pipe through the opening between the legs of the inverted Ω-shaped clip so that the need to remove the inverted Ω-shaped clip is avoided. A problem with the inverted Ω-shaped clip is that it requires an independent fastener to secure the inverted Ω-shaped clip to the support structure. Additionally different sizes of inverted Ω-shaped clips require different sizes of fasteners.

SUMMARY OF THE INVENTION

Accordingly the present invention seeks to provide a novel clip, which reduces, preferably overcomes, the above-mentioned problems.

Accordingly the present invention provides a clip comprising first and second locating members interconnected by an interconnecting member, the interconnecting member has attachment means whereby the clip is rotatable between a first position in which the attachment means of the clip is insertable and/or removable from an aperture in a support member and a second position in which the attachment means of the clip is securable in the aperture in the support member.

Preferably the interconnecting member is substantially U-shaped.

Preferably the interconnecting member comprises first and second base members interconnected by a linking member, the first and second base members are connected to the first and second locating members respectively.

Preferably the first and second base members comprise seating members projecting from the first and second base members towards the linking member, the seating members being arranged to abut a first surface of the support member when the clip is in the second position.

Preferably the linking member comprises seating members projecting from the linking member towards the first and second base members, the seating members being arranged to abut a second surface of the support member when the clip is in the second position.

Preferably the linking member comprises cam surfaces to guide the clip from the first position to the second position.

Preferably the linking member twists between the first position and the second position such that the first and second locating members move from a misaligned state in the first position to an aligned state in the second position.

Preferably the clip comprises a single piece of ductile resilient sheet material.

Preferably the aperture in the support member is substantially Z-shaped.

Preferably the aperture in the support member comprises locking pawls to lock the clip in the second position.

Preferably the first and second locating members are C-shaped, V-shaped, L-shaped, l-shaped, Z-shaped or W-shaped.

Preferably the clip is an inverted Ω-shaped clip.

BRIEF DESCRIPTION OF THE DRAWINGS

The present invention will be more fully described by way of example with reference to the accompanying drawings in which:

FIG. 3 shows a plan view of a support member having an aperture into which the according to the present invention is inserted.

FIG. 4 shows a side view of an inverted Ω-shaped clip according to the present invention inserted into the aperture in the support member.

FIG. 5 shows a view in the direction of arrow A in FIG. 4.

FIG. 6 shows a view of the support member from underneath and the position of abutment of the seating members of the inverted Ω-shaped clip.

FIG. 7 shows an alternative inverted Ω-shaped clip according to the present invention.

FIGS. 8A, 8B and 8C show further alternative inverted Ω-shaped clips according to the present invention.

FIG. 9 shows another inverted Ω-shaped clip according to the present invention.

DETAILED DESCRIPTION OF THE INVENTION

Figure 1:
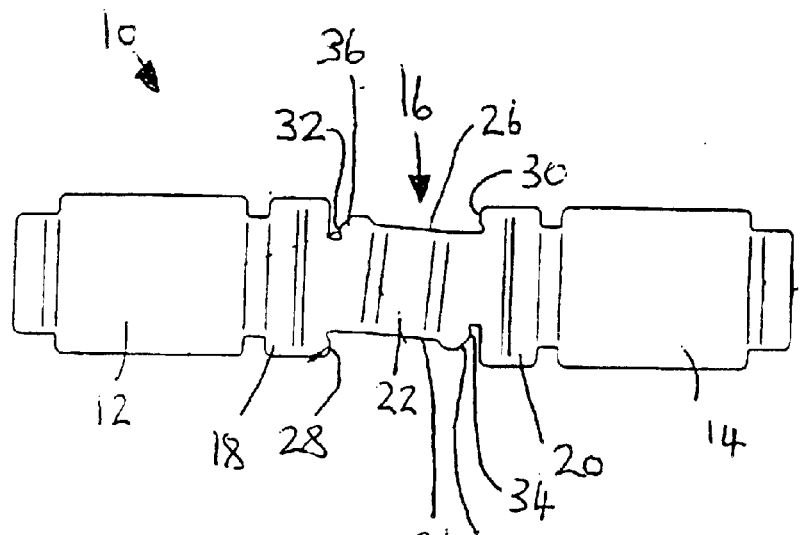
FIG. 1 shows a plan view of a cut piece of sheet material used to form an inverted Ω-shaped clip according to the present invention.

An inverted Ω-shaped clip 10, according to the present invention, is shown in FIGS. 1, 2, 4 and 5. The inverted Ω-shaped clip 10 comprises first and second locating members, in this example C-shaped clamping members, 12 and 14 respectively, which are interconnected by an interconnecting member 16. The interconnecting member 16 is substantially U-shaped and comprises first and second base members 18 and 20 respectively interconnected by a linking member 22. The linking member 22 is narrower than the first and second base members 18 and 20. The first and second base members 18 and 20 are connected to the first and second clamping members 12 and 14 respectively.

The first base member 18 has a seating member 28 projecting away from the first C-shaped member 12 and towards the linking member 22 at a first side 24 of the linking member 22. The second base member 20 has a seating member 30 projecting away from the second C-shaped member 14 and towards the linking member 22 at a second side 26 of the linking member 22.

The linking member 22 has a first seating member 32 projecting towards the first base member 12 at the second side 26 of the linking member 22 and a second seating member 34 projecting towards the second base member 14 at the first side 24 of the linking member 22. The linking member 22 has a first cam surface 36 running to the first seating member 32 on the second side 26 of the linking member 22 and a second cam surface 38 running to the second seating member 34 on the first side 24 of the linking member 22. The linking member 22 forms an integral attachment means for fastening the inverted Ω-shaped clip 10 to a support member 40.

The support member 40 has a substantially Z-shaped aperture 42, as shown in FIG. 3, into which the inverted Ω-shaped clip 10 is insertable. The aperture 42 has a pair of locking pawls 44 and 46. The support member 40 has an upper surface 48 and an under surface 50.

In use the inverted Ω-shaped clip 10 is inserted into the aperture 42 in the support member 40 and the inverted Ω-shaped clip 10 is then rotated from a first position to a second position in a clockwise direction through an angle of about 45°, as shown in FIGS. 3 and 4. More particularly only the linking member 22, or the attachment means, of the inverted Ω-shaped clip 10 is inserted into the aperture 42 in the support member 40.

Figure 2:
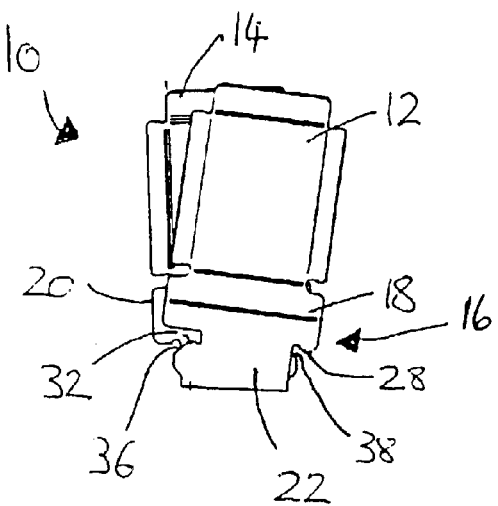
FIG. 2 shows the inverted Ω-shaped clip according to the present invention.

The rotation of the inverted Ω-shaped clip 10 from the first position to the second position causes the first and second cam surfaces 34 and 36 of the linking member 22 to abut the under surface 50 of the support member 40 around the aperture 42. Also the first and second seating members 28 and 30 on the first and second base members 18 and 20 abut the upper surface 48 of the support member 40 around the aperture 40. Continued rotation of the inverted Ω-shaped clip 10 towards the second position causes the seating members 32 and 34 to abut the under surface 50 of the support member 40 around the aperture 42. The rotation of the inverted Ω-shaped clip 10 to the second position causes the linking member 22 to twist, as shown in FIGS. 4 and 5, such that the first and second clamping members 12 and 14 move from an unaligned position, as shown in FIG. 2, to an aligned position, as shown in FIG. 4.

The inverted Ω-shaped clip 10 has four seating members 28, 30, 32, 34 arranged in a rectangle to abut the under surface 50 and upper surface 48 of the support member 40. In particular the first seating member 28 on the first base member 18 abuts the upper surface 48 of the support member 40, the second seating member 30 on the second base member 14 abuts the upper surface 48 of the support member 40, the seating members 34 and 36 on the linking member 22 abut the under surface 50 of the support member 40. The seating members 28, 30, 32 and 34 are sprung loaded by the twisted linking member 22 such that any pair of seating members 28, 30 is always in equilibrium with the remaining pair of seating members 32, 34 to provide stability, reduce rattling, vibrating and fretting of the inverted Ω-shaped clip 10.

The inverted Ω-shaped clip 10 is locked in position due to the abutment of the linking member 22 with a pair of locking pawls 44 and 46 in the side of the aperture 42. The inverted Ω-shaped clip 10 cannot be removed, moved from the second position to the first position, until the first and second C-shaped clamping members 12 and 14 of the inverted Ω-shaped clip 10 are squeezed together to disengage the linking member 22 from the pair of locking pawls 44 and 46.

The concept is applicable to all sizes of inverted Ω-shaped clip by the use of the same size of linking member and base members but with different sizes of C-shaped clamping members.

The inverted Ω-shaped clip comprises a single, integral, piece of ductile, resilient sheet material, for example a suitable metal e.g. steel, titanium, aluminium, nickel, titanium alloy, aluminium alloy or nickel alloy etc. The inverted Ω-shaped clip may be produced by laser machining the sheet material or by stamping the sheet material.

A fuel pipe, lubricant pipe, electrical harness etc to be supported and located is simply pushed between the C-shaped clamping members 12 and 14 of the inverted Ω-shaped clip 10 such that the C-shaped clamping members 12 and 14 fit around the fuel pipe, lubricant pipe, electrical harness etc.

The advantage of the present invention is that the inverted Ω-shaped clip has an integral attachment means such that there is no need for a separate fastener, screw, bolt, rivet etc. The present invention also provides a vibration and fret resistant inverted Ω-shaped clip when installed. The present invention also provides an inverted Ω-shaped clip, which has an anti-rotation lock. The present invention also provides an inverted Ω-shaped clip, which is easily and quickly installed and/or removed.

Although the present invention has been described with reference to an inverted Ω-shaped clip comprising two C-shaped clamping members it is equally applicable to apply the concept of the present invention to other shapes of locating members to support and locate other objects. For example the present invention is also applicable to an inverted Ω-shaped clip 50 comprising V-shaped clamping members as shown in FIG. 7, inverted Ω-shaped clips 60, 70 and 80 comprising L-shaped locating members as shown in FIGS. 8A, 8B and 8C, or an inverted Ω-shaped clip 90 comprising l-shaped locating members as shown in FIG. 9. Additionally inverted Ω-shaped clips comprising Z-shaped locating members, W-shaped locating members or other suitably shaped locating members are also possible.

In the case of the L-shaped locating members the L-shaped locating members may be arranged such that the bases of both of the L-shaped locating members extend towards each other as in FIG. 8A, that the bases of both of the L-shaped locating members extend away from each other as shown in FIG. 8B or that the base of the first L-shaped locating member extends towards the second L-shaped locating member and the base of the second L-shaped locating member extends away from the first L-shaped locating member as shown in FIG. 8C.

In the case of the C-shaped and V-shaped locating members the C-shaped and V-shaped locating members may be arranged such that curved portions of both of the C-shaped locating members extend away from each other as shown in FIG. 5, that the curved portions of both of the C-shaped locating members extend towards each other or that the curved portions of the first C-shaped locating member extends towards the second C-shaped locating member and the curved portion of the second C-shaped locating member extends away from the first C-shaped locating member.

The present invention may be applicable to other shapes of clip as well as the inverted Ω-shaped clips.

I claim:

1. A clip comprising first and second locating members interconnected by an interconnecting member, the interconnecting member having attachment means whereby the clip is rotatable between a first position in which the attachment means of the clip is insertable and/or removable from an aperture in a support member and a second position in which the attachment means of the clip is securable in the aperture in the support member, wherein the interconnecting member comprises first and second base members interconnected by a linking member, a first end of the first base member being connected to the first locating member and a first end of the second base member being connected to the second locating member, a second end of the first base member being connected to the linking member and a second end of the second base member being connected to the linking member and wherein the linking member is twistable between the first position and the second position such that the first and second locating members move from a misaligned state in the first position to an aligned state in the second position.

2. A clip as claimed in claim 1 wherein the interconnecting member is substantially U-shaped.

3. A clip as claimed in claim 1 wherein the first and second base members comprise seating members projecting from the first and second base members towards the linking member, the seating members being arranged to abut a first surface of the support member when the clip is in the second position.

4. A clip as claimed in claim 1, wherein the linking member comprises cam surfaces to guide the clip from the first position to the second position.

5. A clip as claimed in claim 1 wherein the clip comprises a single piece of ductile resilient sheet material.

6. A clip as claimed in claim 5 wherein the ductile resilient sheet material comprises a metal.

7. A clip as claimed in claim 6, wherein the ductile resilient sheet material comprises one of steel, titanium, aluminum, nickel, titanium alloy, aluminum alloy and nickel alloy.

8. A clip as claimed in claim 1 wherein the first and second locating members are C-shaped, V-shaped, L-shaped, I-shaped, Z-shaped or W-shaped.

9. A clip as claimed in claim 1 wherein the clip is an inverted-shaped clip.

10. A clip comprising first and second locating members interconnected by an interconnecting member, the interconnecting member having attachment means whereby the clip is rotatable between a first position in which the attachment means of the clip is insertable and/or removable from an aperture in a support member and a second position in which the attachment means of the clip is securable in the aperture in the support member, wherein the interconnecting member comprises first and second base members interconnected by a linking member, the first and second base members being connected to the first and second locating members respectively and wherein the linking member twists between the first position and the second position such that the first and second locating members move from a misaligned state in the first position to an aligned state in the second position and wherein the linking member comprises seating members projecting from the linking member towards the first and second base members, the seating members being arranged to abut a second surface of the support member when the clip is in the second position.

11. A clip comprising first and second locating members interconnected by an interconnecting member, the interconnecting member having attachment means whereby the clip is rotatable between a first position in which the attachment means of the clip is insertable and/or removable from an aperture in a support member and a second position in which the attachment means of the clip is securable in the aperture in the support member, wherein the interconnecting member comprises first and second base members interconnected by a linking member, the first and second base members being connected to the first and second locating members respectively and wherein the linking member twists between the first position and the second position such that the first and second locating members move from a misaligned state in the first position to an aligned state in the second position and wherein the aperture in the support member is substantially Z-shaped.

12. A clip comprising first and second locating members interconnected by an interconnecting member, the interconnecting member having attachment means whereby the clip is rotatable between a first position in which the attachment means of the clip is insertable and/or removable from an aperture in a support member and a second position in which the attachment means of the clip is securable in the aperture in the support member, wherein the interconnecting member comprises first and second base members interconnected by a linking member, the first and second base members being connected to the first and second locating members respectively and wherein the linking member twists between the first position and the second position such that the first and second locating members move from a misaligned state in the first position to an aligned state in the second position and wherein the aperture in the support member comprises locking pawls to lock the clip in the second position.

13. A clip comprising first and second locating members interconnected by an interconnecting member, the interconnecting member having attachment means whereby the clip is rotatable between a first position in which the attachment means of the clip is insertable and/or removable from an aperture in a support member and a second position in which the attachment means of the clip is securable in the aperture in the support member wherein the interconnecting member comprises first and second base members interconnected by a linking member, the first and second base members are connected to the first and second locating members respectively and wherein the linking member comprises seating members projecting from the linking member towards the first and second base members, the seating members being arranged to abut a second surface of the support member when the clip is in the second position.

14. A clip comprising first and second locating members interconnected by an interconnecting member, the interconnecting member having attachment means whereby the clip is rotatable between a first position in which the attachment means of the clip is insertable and/or removable from an aperture in a support member and a second position in which the attachment means of the clip is securable in the aperture in the support member wherein the interconnecting member comprises first and second base members interconnected by a linking member, the first and second base members are connected to the first and second locating members respectively and wherein the linking member is formed with cam surfaces thereon to guide the clip from the first position to the second position.

15. A clip comprising first and second locating members interconnected by an interconnecting member, the interconnecting member having attachment means whereby the clip is rotatable between a first position in which the attachment means of the clip is insertable and/or removable from an aperture in a support member and a second position in which the attachment means of the clip is securable in the aperture in the support member wherein the interconnecting member comprises first and second base members interconnected by a linking member, the first and second base members are connected to the first and second locating members respectively and wherein the aperture in the support member is substantially Z-shaped.

* * * * *